(12) United States Patent
Buxbaum

(10) Patent No.: US 6,923,944 B2
(45) Date of Patent: Aug. 2, 2005

(54) MEMBRANE REACTOR FOR GAS EXTRACTION

(76) Inventor: Robert E. Buxbaum, 25451 Gardner Pl., Oak Park, MI (US) 48237

( * ) Notice: Subject to any disclaimer, the term of this patent is extended or adjusted under 35 U.S.C. 154(b) by 599 days.

(21) Appl. No.: 09/901,398

(22) Filed: Jul. 9, 2001

(65) Prior Publication Data

US 2002/0006369 A1 Jan. 17, 2002

Related U.S. Application Data

(60) Provisional application No. 60/216,561, filed on Jul. 7, 2000.

(51) Int. Cl.[7] .............................. B01J 8/02; B01D 53/22
(52) U.S. Cl. .................... 422/211; 422/198; 422/222; 48/127.9
(58) Field of Search ................. 422/197, 198, 422/202, 203, 204, 211, 220, 222; 48/127.7, 127.9, 128, 198.2; 423/651–654

(56) References Cited

U.S. PATENT DOCUMENTS

| | | | |
|---|---|---|---|
| 4,810,485 A | | 3/1989 | Marianowski et al. ... 423/648.1 |
| 4,865,630 A | * | 9/1989 | Abe ................................ 96/11 |
| 4,981,676 A | * | 1/1991 | Minet et al. ................. 423/652 |
| 5,614,001 A | * | 3/1997 | Kosaka et al. ................... 96/10 |
| 5,639,431 A | * | 6/1997 | Shirasaki et al. ............ 422/212 |
| 5,888,273 A | | 3/1999 | Buxbaum ....................... 95/56 |
| 5,931,987 A | | 8/1999 | Buxbaum ....................... 95/55 |
| 5,938,800 A | * | 8/1999 | Verrill et al. ............... 48/127.9 |
| 5,958,091 A | * | 9/1999 | Sakai et al. ..................... 48/61 |
| 6,139,810 A | * | 10/2000 | Gottzmann et al. .......... 422/197 |
| 6,221,117 B1 | * | 4/2001 | Edlund et al. .................. 48/76 |
| 6,228,147 B1 | * | 5/2001 | Takahashi ....................... 95/55 |
| 6,231,831 B1 | * | 5/2001 | Autenrieth et al. ....... 423/648.1 |
| 6,461,408 B2 | * | 10/2002 | Buxbaum ....................... 95/55 |

FOREIGN PATENT DOCUMENTS

JP 06345408 A * 12/1994

\* cited by examiner

*Primary Examiner*—Kevin P. Kerns
(74) *Attorney, Agent, or Firm*—Gifford, Krass, Groh, Sprinkle, Anderson & Citkowski, P.C.

(57) ABSTRACT

The membrane reactor of the present invention generates a desired gas such as hydrogen produced by steam reforming liquid fuels. The membrane reactor provides thermal integration between the heating source and the reaction catalyst by heat conduction through a solid medium. Pressure energy within the membrane reactor provides compression of the feed to lower the partial pressure of product within the reactor, thereby increasing the membrane reactor effect.

29 Claims, 1 Drawing Sheet

MEMBRANE REACTOR FOR GAS EXTRACTION

RELATED APPLICATION

This patent application claims priority of provisional patent application 60/216,561, filed Jul. 7, 2000.

FIELD OF THE INVENTION

The present invention relates to an apparatus for the generation of a gas and the separation and purification of the generated gas from a mixed gas flow; and, more particularly, the generation of hydrogen by steam reforming liquid fuel and the purification of hydrogen from a mixture of gases using a hydrogen selective membrane.

BACKGROUND OF THE INVENTION

One of the main problems with the use of a conventional reactor to convert liquid and hydrocarbon fuels to hydrogen for use in fuel cells or for industrial applications is that the hydrogen is produced as an impure mixture. A purifier, either using membranes or pressure swing absorption often is used in-line after the reactor, but a better solution for many applications is a membrane reactor, a device that combines a hydrogen generating reactor and a hydrogen extracting membrane. Membrane reactors combine in one vessel a reaction, that often is catalyzed with a membrane that extracts a product or introduces a reactant. Such reactors have advantages over conventional reactors especially for applications like converting liquid hydrocarbon fuels to hydrogen for use in fuel cells or for chemical applications. R. E. Buxbaum, *Journal of Separation Science*, 1999. With a suitable membrane, a membrane reactor produces ultra-pure hydrogen and allows the endothermic forming reaction to go forward at higher pressures and lower temperatures than would be feasible otherwise. Membrane reactors of this type are illustratively described in U.S. Pat. Nos. 4,810,485; 5,888,273; and 5,931,987.

In membrane reactors such as those identified above, an appropriate feedstock material such as methane-water, methanol-water or ammonia is heated to boiling outside of the reactor and reacted in the presence of a reaction catalyst. Hydrogen as well as undesirable gases are produced, but only the hydrogen is extracted through the membranes.

In these prior art reactors the catalyst is distributed within the reactor housing such that catalyst is in contact with a membrane making horizontal orientation of the reactor apparatus difficult because reaction catalyst displacement causes lower efficiency gas collection.

The hydrogen output of the reactor is determined in large part by heat transfer to the reaction catalyst and to a much lesser extent by permeation in the membrane or specific activity in the reaction catalyst. Heat transfer is increased temporarily by using higher temperature heating gases, for example, and reaction rates rise as expected, but this solution often harms the reaction catalyst and can reduce the overall thermal efficiency as well. Thus, there exists a need for a membrane reactor that achieves better thermal integration between a heat source and a reaction catalyst.

SUMMARY OF THE INVENTION

A gas purification system includes a reactor having a wall with both interior and exterior sides and a communicating portal therebetween for a mixed gas flow. A reaction catalyst coating is in contact with the interior side of the wall. A gas selective membrane resides within the reactor volume in contact with the mixed gas flow and selectively passes a constituent gas of the mixed gas flow therethrough with a raffinate of the mixed gas flow retained in contact with the membrane. An outlet channel for removing the raffinate from contact with the membrane is provided, and a passageway for the removal of the constituent gas from the interior of said reactor is also provided.

A reactor is also provided herein for conducting endothermic reactions therein. The reactor has a volume and a wall, the wall has an interior side and an exterior side and a communicating portal therebetween for a mixed gas flow. A gas selective membrane within the reactor volume is in contact with the mixed gas flow and selectively passes a constituent gas of the mixed gas flow therethrough whereby a raffinate of the mixed gas flow is retained in contact with the membrane. An outlet channel is provided for removing the raffinate from contact with the membrane. A passageway for removal of the constituent gas from the interior of the reactor is also provided. A catalyst is present in contact with the exterior side of the reactor, the catalyst inducing an exothermic combustion reaction with the raffinate and optionally additional combustible fuel in order to elevate the reactor interior temperature to a desired level.

DETAILED DESCRIPTION OF THE INVENTION

Thermal integration of a heat source and a reaction catalyst is achieved by providing an apparatus to allow heat to transfer through a solid component to the reaction catalyst. The reaction catalyst is coated on the interior of the reactor body and/or on the interior of a feed tube. A coated feed tube functions as a pre-reactor. Optionally the feed tube is coiled. Further thermal integration is achieved by coating a combustion catalyst on an exterior surface of the reactor and/or feed tube ceramic support.

A reaction taking place in the reactor of the present invention illustratively includes a cracking reaction and an aromatization reaction. The reactor includes a membrane selective for specific materials, such as a desired gas. For example, where the reactor generates hydrogen, a hydrogen selective membrane is included. A hydrogen selective membrane includes a hydrogen selective material such as palladium-coated refractory metals, or alloys of refractory metals, polymers, palladium-silver, palladium-copper, porous metals, silica and ceramics.

In another embodiment of the present invention, the desired gas generated by the reactor is a synthetic gas where an oxygen-containing gas mixture, such as air, contacts the oxygen selective membrane causing oxygen ions to diffuse through the membrane. A mixed gas containing a low molecular weight hydrocarbon, such as methane, is brought into contact with the oxygen to form synthesis gas and higher hydrocarbons. Catalysts for conversion of hydrocarbons to synthesis gas and membranes selective for oxygen are well known in the art as illustratively detailed in Nataraj et al., U.S. Pat. No. 6,214,066.

A membrane included in the reactor of the present invention is preferably tubular and has a diameter ranging from 0.02 to 0.25 inches. One or more membranes is included in the reactor.

Reaction Catalyst Coating

Figure 1:
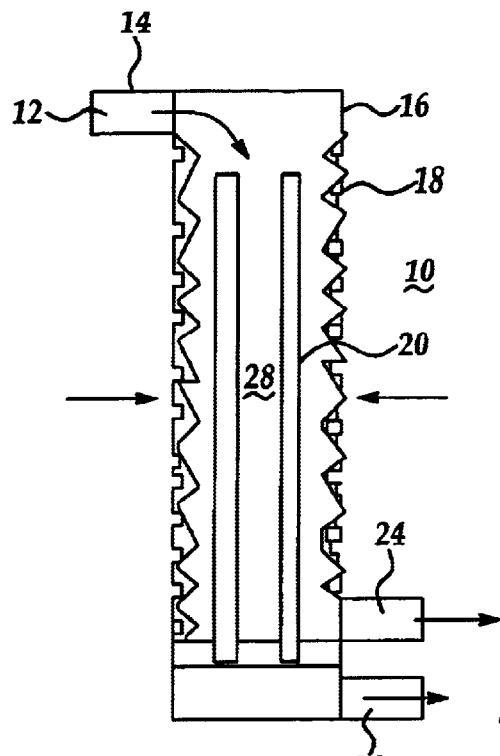
FIG. 1 is a schematic-cross sectional view of a membrane reactor apparatus including a reaction catalyst coated on the external wall of the reactor according to the present invention.

Heat transfer by gas phase thermal conduction is less efficient than solid state thermal conduction. In a preferred embodiment, the present invention provides solid state thermal conduction in a gas generating membrane reactor where the reaction catalyst 28 is coated on the interior side 18 of the wall of a reactor, shown generally at 10 in FIG. 1. A feed tube for mixed gases having a wall with an interior side 12 and an exterior side 14 conducts gases into the reactor 10. The reactor has a wall having an exterior side 16 and an interior side 18 coated with reaction catalyst 28. A tube 20 has a selective membrane allows the passage of a desired gas through a purified gas outlet 26 for collection. Raffinate gas exits through a passage 24.

Suitable reaction catalysts include but are not limited to promoted nickel on alumina. Optionally, space is left unfilled between the reaction catalyst coated wall and the membrane. The space between the reaction catalyst coated wall and the membrane optimally ranges from 0.05 to 1.0 inches. More preferably, the space ranges from 0.3 to 0.6 inches.

In another embodiment, the space between the membrane and the catalyst on interior side of the wall is occupied by a flow distributor. A flow distributor is composed of a suitable material illustratively including packing, particulate, mesh wire, wool, granule, pellet, or fluidized catalyst where the reactor is operated in a flow up mode with a proper distribution plate. Illustrative examples of appropriate packing are described in U.S. Pat. No. 5,931,987. A fluidized bed membrane reactor is illustratively described in U.S. Pat. Nos. 5,326,550; 6,183,169; and 6,212,794.

Figure 2:
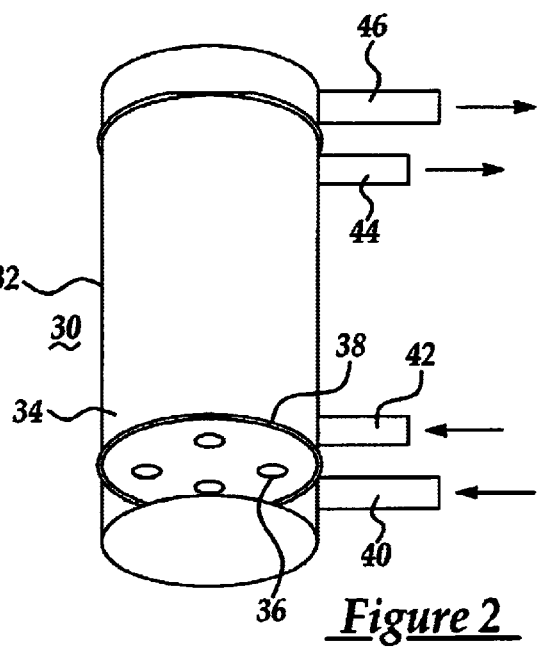
FIG. 2 is a perspective view of a membrane reactor of the present invention having a multichannel monolith.

In a further preferred embodiment, the space between the catalyst on interior side of the wall and the membrane is filled by a multichannel monolith. This configuration extends solid state heat transfer throughout a reactor shown generally at 30 in FIG. 2. FIG. 2 specifically shows a configuration for generation of a syngas or higher hydrocarbon. However, it will be appreciated that the same reactor is configured for generation and collection of other desirable gases such as hydrogen by incorporating an appropriate membrane, an appropriate reaction catalyst and supplying appropriate starting gases as described herein and in U.S. Pat. Nos. 5,888,273 and 5,931,987. The reactor 30 has a wall 32 that encloses a monolith 34 containing a channel 36 coated with a selective membrane and reaction catalyst. The monolith is sealed against the interior reactor wall using a gasket 38. An air inlet 40 is present on one side of the monolith 34 while a lower hydrocarbon inlet valve 42 is present on an opposing side of the monolith. Exit passages for a desired gas and a waste gas are present at 44 and 46 respectively.

A suitable porous multichannel monolith substrate of this type is generated by techniques known to those skilled in the art. U. Balachandran, *Prepr. Pap.—Am. Chem. Soc., Div. Fuel Chem.*, 42(2), 1997, pp. 591–595. A porous multichannel monolith suitable for inclusion in a reactor of the present invention has channels or pores of diameter ranging from 10 micrometers to 1 millimeter.

A monolith substrate, once cast, is coated with reaction catalyst. The coating of the monolith substrate is achieved by a suitable method illustratively including dip coating. The channels present in the monolith substrate are coated with a selective coating illustratively including palladium-copper or perovskite oxides, so that the channels are gas transport selective. For example, a sintered filter is wash coated such that a layer of alumina ranging from 1 to 100 micrometers in thickness is deposited. A wash coat of a selective membrane material such as palladium is then applied followed by a coating of a reaction catalyst such as Cu or $Ce_2O_3$. The edges of the monolith substrate are then sealed, by methods for example including using a gasket. In addition, monolith substrates as described in U.S. Pat. No. 6,239,064 are operative herein. Appropriate selective coating processes are known for single channel monoliths and catalytically inactive porous substrates. U.S. Pat. 5,652,020 and V. Jayaraman and Y. S. Lin, *J Membrane Sci.*, 104, 1995, pp. 251–262.

The monolith substrate is used in autothermal reforming or syngas production where the heat is generated within the channels as well as in endothermic reactions for which external heat is supplied. Where the monolith substrate membrane reactor is used for an endothermic reaction such as that in which hydrogen is produced by methanol reforming or ammonia cracking, good thermal contact between the coated monolith substrate and the wall is preferred for efficient heat transfer. The monolith is attached to the exterior wall of the reactor by any appropriate known method illustratively including using a ceramic paste. In a preferred embodiment, the monolith is attached in a way that allows differential thermal expansion illustratively including use of a ceramic felt gasket. Felt gaskets are well known in the manufacture of automotive catalytic converters.

In a preferred embodiment, where a catalyst coated monolith substrate is used in a membrane reactor of the present invention, the selective membrane layer is coated on the interior surface of the monolith channels.

The reactor of the present invention is oriented in any desired direction including horizontal and vertical.

Combustion Catalyst Coatings

For endothermic reactor applications, a heat source external to the reactor is required to drive the hydrogen-generation reaction. Heat is transferred to the reactor via a liquid or gas. Hot gases produced by combustion of the less desirable gases, or waste products of the reactor, are brought to the external surface of the reactor wall by a suitable method illustratively including free convection and low pressure forced convection. However, the external thermal resistance is typically significant resulting in inefficient heat transfer from the hot gases external to the reactor to the internal reactor. Therefore, in a preferred embodiment, external heat is transferred by coating a combustion catalyst on an exterior wall of a reactor and driving the combustion gases and air over that surface, reducing external gas phase heat transfer resistance. Application techniques for combustion catalysts are known to those skilled in the art of automotive catalytic converters. The reactor wall is formed of a suitable material illustratively including metal such as aluminized stainless steel, stainless steel metal felt or reticulated metal or ceramic or mixtures such as platinum supported on a porous alumina ceramic and one of skill in the art will recognize the appropriate combination of reactor wall material and combustion catalyst material. A combustion catalyst illustratively includes mixed oxides of platinum, palladium, chromium, nickel and rhodium.

Heat Transfer Fin

In a further preferred embodiment heat is transferred from combustion gases to the reactor wall more effectively by increasing the surface area of the exterior surface of the reactor wall. The surface area of the exterior surface is increased in any of a number of ways illustratively including adding an element such as bumps or packing to the exterior surface of the reactor wall or adding extended surface reactor vessel such as a fin tube. A fin tube is oriented radially, axially or helically in direction with respect to the reactor wall. An element of the reactor wall added to increase surface area is optionally coated with combustion catalyst. The element of the reactor wall added to increase surface area is optionally a tubular feed for mixed gases. Also optionally, the tubular feed is coated with reaction catalyst on an interior aspect to function as a pre-reactor.

Flow Disruption

In a further preferred embodiment, a low pressure drop flow disrupter is added to the external gas flow channel of the reactor in order to disrupt a stagnant gas layer next to a reactor wall. An illustrative example of low pressure drop gas flow disruptor is found in home hot water heaters where the designs are typically helical. It will be appreciated by those skilled in the art that other flow disruptor conformations may be desirable depending on the design of a particular reactor of the present invention. For example, the flow disruptor illustratively takes the form of bumps, protrusions, baffles or another shape which generates turbulence in a stream of gas contacting the disruptor.

Combination of Heat Transfer Fin and Flow Disruption

Figure 3:
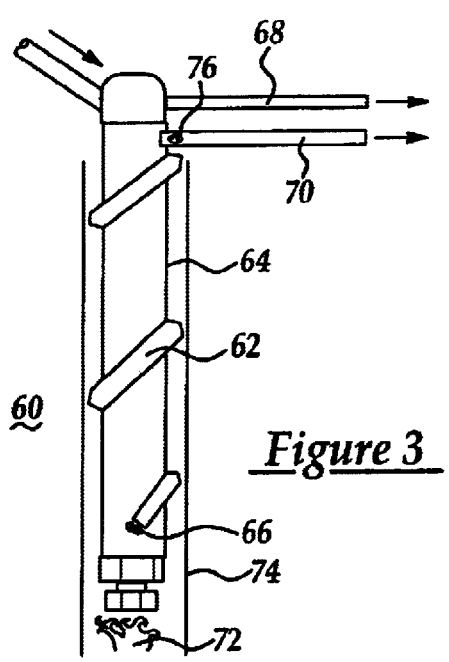
FIG. 3 is a perspective view of a membrane reactor having a coiled feed tube coated with combustion catalyst according to the present invention.

The exterior surface of a reactor is increased as described and combined with flow disrupting means in order to increase heat transfer efficiency. For example, the feed tube is coiled into a helix and brazed to the reactor as shown generally at 60 in FIG. 3. A feed tube for mixed gases 62 is helically coiled around the external wall of the reactor 64 leading into the reactor via a conduit 66. Inside the reactor the mixed gases react to produce a desired gas which passes through a selective membrane and exits through a purified gas outlet 68. Raffinate gas exits through passage 70. A plug 76 is optionally included in the raffinate exit passage where necessary to hold reaction catalyst in place. Heat is provided to the reactor in part by a heat source 72 and conducted through a chimney 74 enclosing the reactor. This combination provides additional surface area such that the feed tube surface area is almost as large as that of the original reactor, and the flow of combustion gases is disrupted from below at minimal pressure drop.

In a preferred embodiment, pellets of reaction catalyst, G66, are placed within the coiled feed tube to enhance internal heat transfer to the reactor and provide a pre-reactor with a large ratio of surface to volume.

Heat Transfer within Channels

In a preferred embodiment, external heat transfer enhancement occurs through heated channels within the reactor. For example, a hot purge gas, or sweep gas, flows through the same channel as the membrane purified hydrogen and exits with the hydrogen. A still more preferred embodiment includes a straight tube hydrogen permeable membrane with a catheter to allow the purge gas to be introduced and withdrawn. The hydrogen produced flows through a shell provided with an inlet and an outlet and a sweep gas flows through the catheter and annular space of a tube, exiting with the formed hydrogen. This configuration is useful in reactors converting methane or similar light hydrocarbons to benzene and similar higher hydrocarbons. For example, where $6CH_4 \rightarrow benzene + 9H_2$.

It is appreciated that a method of enhancing heat transfer from the outside of the reactor to the inside, such as coating a combustion catalyst on an exterior wall, increasing the exterior wall surface area, disrupting gas flow and directing hot gas into an interior channel, can be combined with another method of enhancing heat transfer or used alone. A method or combination of methods for enhancing heat transfer from the outside of the reactor to the inside is combined with a method for enhanced heat transfer within the reactor such as coating a reaction catalyst on an interior wall of the reactor and placing a catalyst-coated monolith within the reactor.

Sweep Gas Flow to Lower Partial Pressure

A sweep gas is directed through a catheter to the inside of the hydrogen permeable tubes to decrease a partial pressure gradient across the membrane wall. A suitable sweep gas for this application is an inexpensive, readily available, non-toxic gas that is readily separated from the hydrogen, such as steam. A sweep gas is optionally an inert gas such as neon, argon, or nitrogen.

Feed Liquid Compression

In a preferred embodiment, the feed liquid entering an inventive reactor is compressed using pressure energy in the raffinate. Several steam engine type designs are suitable, illustratively including a simplex, duplex, double duplex acting steam pump or donkey. In the present invention, the raffinate gas is expanded against a piston and the liquid feed compressed using the other end of the piston turned smaller than the first piston end, or a second smaller piston attached by a rocker to the first piston. A membrane reactor including a compressor optionally also includes a secondary pressure release for the expanding raffinate gases. In a reactor of the present invention including a compressor, the mixed gas feed is controlled by provided valves. Compressor designs of this sort are known to those skilled in the art of steam locomotion. Suitable designs are shown in the book, "LBSC's shop, shed and road", by Martin Evans (1979), chapter 3. It is be appreciated that this feed compression is used either in combination with a heat transfer method as disclosed herein or alone.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

One skilled in the art will readily appreciate that the present invention is well adapted to carry out the objects and obtain the ends and advantages mentioned, as well as those inherent therein. The present methods, procedures, treatments, molecules, and specific compounds described herein are presently representative of preferred embodiments, are exemplary, and are not intended as limitations on the scope of the invention. Changes therein and other uses will occur to those skilled in the art which are encompassed within the spirit of the invention as defined by the scope of the claims.

What is claimed is:

1. A gas purification system comprising:

a reactor having a volume and a wall, the wall having an interior side and an exterior side, and a communicating portal therebetween for a mixed gas flow;

a reaction catalyst coating in contact with the interior side of the wall;

a gas selective membrane within the reactor volume, said gas membrane in contact with the mixed gas flow and selectively passing a constituent gas of the mixed gas flow therethrough, whereby a raffinate of the mixed gas flow is retained in contact with said membrane;

an outlet channel for removing said raffinate from contact with said selective membrane; and a passageway for the removal of the constituent gas from the interior of said reactor.

2. The gas purification system of claim 1 further comprising a heater in thermal contact with said reactor.

3. The gas purification system of claim 1 further comprising a space between the reaction catalyst coating and the membrane.

4. The gas purification system of claim 3 wherein the space ranges from 0.05 inch to 1.0 inch.

5. The gas purification system of claim 3 wherein the space ranges from 0.3 inch to 0.6 inch.

6. The gas purification system of claim 3 wherein the space comprises a flow distributor.

7. The gas purification system of claim 6 wherein the flow distributor is selected from the group consisting of: packing, particulate, mesh wire, wool, granule, pellet and fluidized catalyst.

8. The gas purification system of claim 6 wherein the flow distributor is a multichannel monolith.

9. The gas purification system of claim 8 wherein the multichannel monolith has channels ranging in diameter from 10 micrometers to 1 millimeter.

10. The gas purification system of claim 8 wherein the multichannel monolith has channels ranging in diameter from 50 micrometers to 500 micrometers.

11. The gas purification system of claim 8 wherein the monolith channels are coated.

12. The gas purification system of claim 8 wherein the monolith channels are coated with a reaction catalyst.

13. The gas purification system of claim 8 wherein the monolith channels are coated with a selective membrane.

14. The gas purification system of claim 8 wherein the monolith is bonded to the reactor wall such that heat is conducted from the wall exterior to the wall interior.

15. The gas purification system of claim 8 further comprising a combustion catalyst in thermal contact with the reactor.

16. The gas purification system of claim 1 further comprising a flow disruptor.

17. The gas purification system of claim 2 wherein the heating means comprises a sweep gas.

18. The gas purification system of claim 17 wherein the sweep gas is inert.

19. The gas purification system of claim 17 wherein the sweep gas is steam.

20. The gas purification system of claim 1 further comprising partial pressure decreasing means.

21. The gas purification system of claim 20 wherein the partial pressure decreasing means is sweep gas flow.

22. The gas purification system of claim 1 further comprising feed liquid compression means.

23. The gas purification system of claim 1 wherein the membrane is tubular.

24. The gas purification system of claim 1 further comprising a plurality of the membranes.

25. The gas purification system of claim 1 wherein the membrane is hydrogen selective and the constituent gas is hydrogen.

26. The gas purification system of claim 1 wherein the catalyst coating comprises a methanol reforming catalyst.

27. The gas purification system of claim 1 wherein the catalyst coating comprises an ammonia cracking catalyst.

28. The gas purification system of claim 1 wherein heat is provided by catalytic combustion.

29. The gas purification system of claim 1 wherein said reactor further comprises a heat transfer fin on the exterior surface thereof.

* * * * *